US008903138B1

(12) United States Patent
Steffens et al.

(10) Patent No.: US 8,903,138 B1
(45) Date of Patent: Dec. 2, 2014

(54) FACE RECOGNITION USING PRE-TEMPLATES

(75) Inventors: Johannes Steffens, Westoverledingen (DE); Hartwig Adam, Marina del Rey, CA (US)

(73) Assignee: Google Inc., Mountain View, CA (US)

( * ) Notice: Subject to any disclaimer, the term of this patent is extended or adjusted under 35 U.S.C. 154(b) by 258 days.

(21) Appl. No.: 13/225,819

(22) Filed: Sep. 6, 2011

(51) Int. Cl.
*G06K 9/00* (2006.01)
*G06K 9/36* (2006.01)
*G06K 9/46* (2006.01)

(52) U.S. Cl.
USPC ............................ 382/118; 382/232; 382/282

(58) Field of Classification Search
None
See application file for complete search history.

(56) References Cited

U.S. PATENT DOCUMENTS

| | | | |
|---|---|---|---|
| 6,301,370 B1 | 10/2001 | Steffens et al. | |
| 6,917,703 B1 | 7/2005 | Steffens et al. | |
| 8,249,361 B1 | 8/2012 | Steffens | |
| 2006/0050933 A1 | 3/2006 | Adam et al. | |
| 2008/0019565 A1* | 1/2008 | Steinberg | 382/103 |
| 2008/0267519 A1* | 10/2008 | Monga | 382/248 |
| 2009/0180671 A1* | 7/2009 | Lee et al. | 382/118 |
| 2009/0252383 A1 | 10/2009 | Adam et al. | |
| 2011/0026839 A1 | 2/2011 | Bogart et al. | |
| 2012/0155717 A1* | 6/2012 | Ma et al. | 382/118 |

OTHER PUBLICATIONS

JPEG. Wikipedia, the free encyclopedia, [online], [retrieved on Aug. 4, 2011] Retrieved from <URL:http://en.wikipedia.org/wiki/JPEG>.*
Skodras et al, "The JPEG 2000 Still Image Compression Standard", 2001, IEEE Signal Processing Magazine, 18:5, pp. 36-58.*
Kammoun et al, "A Perceptual Image Coding method of High Compression Rate," 2007, World Academy of Science, Engineering and Technology 9, pp. 828-832.*
Proyecto Fin De Carrera, Face Recognition Algorithms, Universidad del Pais Vasc, Jun. 16, 2010.
Barnabas Takacs, Harry Wechsleri, Detection of Faces and Facial Landmarks Using Iconic Filter Banks, WaveBand Corporation, 1997, Pattern Recognition vol. 30 No. 10, pp. 1623-1636 (Publication No. 0031-3203/97).
Jan Kalina, Locating Landmarks Using Templates (Dissertation), dem Fachbereich Mathematik der Universit at Duisburg-Essen vorgelegt, Aug. 2006.
Khamiss Masaoud. S. Algabary, Khairuddin Omar, A Comparative Study of Face Recognition Using Improved AAM, PCA and ICA via Feret Date Base, European Journal of Scientific Research, 2010, Publication No. ISSN 1450-216X vol. 48 No. 2, pp. 263-272.
JPEG. Wikipedia, the free encyclopedia, [online], [retrieved on Aug. 4, 2011] Retrieved from <URL:http://en.wikipedia.org/wiki/JPEG.

(Continued)

*Primary Examiner* — Bhavesh Mehta
*Assistant Examiner* — David F Dunphy
(74) *Attorney, Agent, or Firm* — Fish & Richardson P.C.

(57) ABSTRACT

Disclosed herein is a method for creating a pre-template for use in facial recognition including detecting a face in a source image, determining face information for the detected face, cropping the source image around the detected face, adjusting a compression level based on a contrast of at least a portion of the detected face, encoding the cropped image based on the adjusted compression level, and storing the encoded cropped image and the face information in a storage medium, wherein the encoded cropped image is subsequently retrieved from the storage medium, decoded and converted to a numerical representation of the detected face to compare the numerical representation with a face in an input image.

40 Claims, 5 Drawing Sheets

(56) References Cited

OTHER PUBLICATIONS

FaceIt SDK, (L-1 Identity Solutions, Inc.) 2006-2010, [online], [retrieved on Aug. 4, 2011] Retrieved from the L-1 Identity Solutions Web Page using Internet <URL:http://www.l1id.com/pages/101-faceit-sdk.

Quantization (image processing). Wikipedia, the free encyclopedia, [online], [retrieved on Aug. 4, 2011] Retrieved from <URL:http://en.wikipedia.org/wiki/Quantization_matrix.

* cited by examiner

FACE RECOGNITION USING PRE-TEMPLATES

TECHNICAL FIELD

The present invention relates in general to face recognition.

BACKGROUND

Facial recognition systems can determine whether a given image or frame of video contains a particular face. Some current facial recognition systems use a template matching technique that uses face templates. Face templates are, for example, highly reduced representations of faces that contain enough information so that the system is able to match a face in an input image/frame with the face template. In some instances, face templates are stored on a storage medium (e.g. secondary storage) and accessed as needed by the facial recognition system.

Current facial recognition systems that store the face templates on storage mediums may not be optimal. For example, in some instances, it may not be permissible to store face templates on a storage medium. Further, for example, the format of and the information contained within the face templates can be highly specific and tailored to the facial recognition systems using the templates. In these instances, improvements to the systems themselves may entail extensive rework of the format of the face template.

SUMMARY

Disclosed herein are embodiments of methods, apparatuses and systems for face recognition.

One aspect of the disclosed embodiments is a method for creating a pre-template for use in facial recognition. The method includes detecting a face in a source image, determining face information for the detected face cropping the source image around the detected face and adjusting a compression level based on a contrast of at least a portion of the detected face. The method also includes encoding the cropped image based on the adjusted compression level using a processor and storing the encoded cropped image and the face information in a storage medium. The encoded cropped image is subsequently retrieved from the storage medium, decoded and converted to a numerical representation of the detected face to compare the numerical representation with a face in an input image.

In another aspect of the disclosed embodiments, an apparatus for creating a pre-template for use in facial recognition is disclosed. The apparatus includes a memory and at least one processor configured to execute instructions stored in the memory to detect a face in a source image, determine face information for the detected face, crop the source image around the detected face and adjust a compression level based on a contrast of at least a portion of the detected face. The at least one processor is further configured to execute instructions stored in the memory to encode the cropped image based on the adjusted compression level and store the encoded cropped image and the face information in a storage medium. The encoded cropped image is subsequently retrieved from the storage medium, decoded and converted to a numerical representation of the detected face to compare the numerical representation with a face in an input image.

Further, another aspect of the disclosed embodiments is a facial recognition system. The system includes a storage medium, a first server and a second server. The first server is configured to: detect a face in a source image, determine face information for the detected face, crop the source image around the detected face, adjust a compression level based on a contrast of at least a portion of the detected face. The first server is further configured to encode the cropped image based on the adjusted compression level and store the encoded cropped image and the face information in the storage medium. The second server is configured to retrieve the encoded cropped image from the storage medium, decode the encoded cropped image, and convert the decoded cropped image to a numerical representation of the detected face using the face information. The second server is further configured to detect a face in an input image and compare the numerical representation with the face in the input image.

In another aspect of the disclosed embodiments, a method for creating a pre-template for use in facial recognition is disclosed. The method includes detecting a face in a source image, determining face information for the detected face, cropping the source image around the detected face and adjusting a compression level based on a contrast of at least a portion of the detected face. The method also includes encoding the cropped image based on the adjusted compression level using a processor and storing the encoded cropped image and face information in a storage medium. The encoded cropped image is subsequently retrieved from the storage medium, decoded and displayed.

In another aspect of the disclosed embodiments, a method for creating a pre-template for use in human recognition is disclosed. The method includes detecting an anatomical feature in a source image, determining anatomical feature information for the detected anatomical feature, and cropping the source image around the detected anatomical feature. The method also includes adjusting a compression level based on a contrast of at least a portion of the detected anatomical feature using a processor, encoding the cropped image based on the adjusted compression level and storing the encoded cropped image and the anatomical feature information in a storage medium. The encoded cropped image is subsequently retrieved from the storage medium, decoded and converted to a numerical representation of the detected anatomical feature to compare the numerical representation with an anatomical feature in an input image.

These and other embodiments will be described in additional detail hereafter.

BRIEF DESCRIPTION OF THE DRAWINGS

The description herein makes reference to the accompanying drawings wherein like reference numerals refer to like parts throughout the several views, and wherein.

DETAILED DESCRIPTION

The embodiments disclosed herein are a preliminary format (hereinafter "pre-template") to templates. The pre-template can be subsequently converted to a template before it is used by the facial recognition system. The pre-template can also be independent of the format required by the facial recognition system. The pre-template, rather than the template, can be stored on a storage medium.

Figure 1:
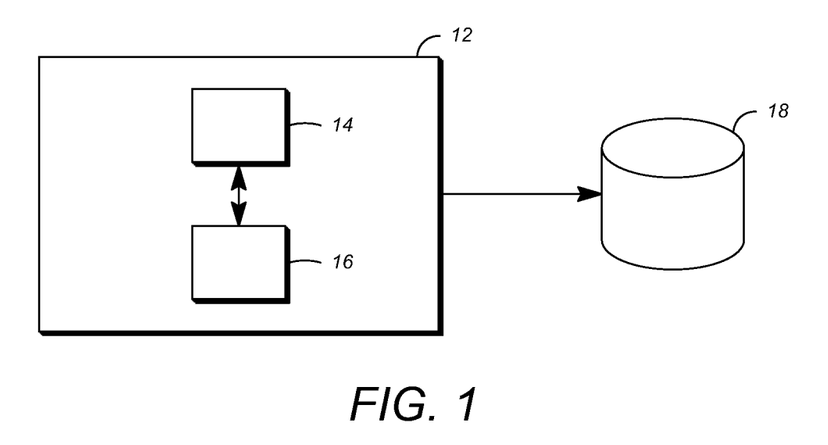
FIG. 1 is a block diagram of a pre-template generator in accordance with one embodiment.

FIG. 1 illustrates a pre-template generator 12 according to one embodiment. An exemplary pre-template generator 12 can be, for example, a computer having an internal configuration of hardware including a processor such as a central processing unit (CPU) 14 and a memory 16. The CPU 14 can be a controller for controlling the operations of the pre-template generator 12. The CPU 14 is connected to the memory 16 by, for example, a memory bus. The memory 16 can be random access memory (RAM) or any other suitable memory device. The memory 16 can store data and program instructions which are used by the CPU 14. Other suitable implementations of the pre-template generator 12 are possible.

The pre-template generator 12 can generate one or more pre-templates and store the pre-templates in a storage medium 18. The pre-template generator 12 can use one or more input/output channels to access and/or transfer data to the storage medium 18. For simplicity, the embodiments will be described with reference to only one storage medium, although it is possible that more than one storage medium can be utilized. Storage medium 18 can be any non-volatile memory that is not directly accessible to the processor (e.g. CPU 14) of pre-template generator. In other words, storage medium 18 is not directly accessible to CPU 14. For example, storage medium 18 can be a mass storage device such as a hard disk, removable medium (CD or DVD), optical discs, flash memory devices, removable hard disk drives or magnetic tape. Other storage mediums are also possible.

Figure 2:
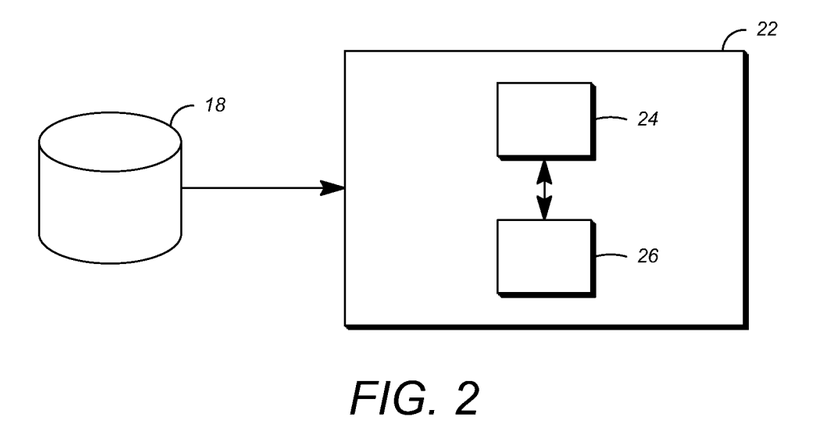
FIG. 2 is a block diagram of a pre-template converter in accordance with one embodiment.

FIG. 2 illustrates a pre-template converter 22 according to one embodiment. An exemplary pre-template converter 22 can be, for example, a computer having an internal configuration of hardware including a processor such as a central processing unit (CPU) 24 and a memory 26. The CPU 24 can be a controller for controlling the operations of the pre-template converter 22. The CPU 24 is connected to the memory 26 by, for example, a memory bus. The memory 26 can be random access memory (RAM) or any other suitable memory device. The memory 26 can store data and program instructions which are used by the CPU 24. Other suitable implementations of the pre-template converter 22 are possible. For example, a display (not shown) can be connected to or integrated within the pre-template converter 22 to, as will be discussed in more detail below, display a decoded image from the information associated with the pre-template.

Once pre-templates have been generated by the pre-template generator 12 and stored on the storage medium 18, they can be retrieved from the storage medium 18 using the pre-template converter. Similar to the pre-template generator 12, the pre-template converter 22 can use one or more input/output channels to access and/or retrieve data from the storage medium 18. As discussed previously, each pre-template stored on storage medium can be converted to a corresponding template using the pre-template converter 22. In some instances, all of the pre-templates can be converted at once before they are used in for example, face recognition processing. In other instances, the conversion can occur on-the-fly. That is, the pre-templates can be converted as they are retrieved from the storage medium 18. In addition, less than all of the pre-templates may be converted.

Figure 3:
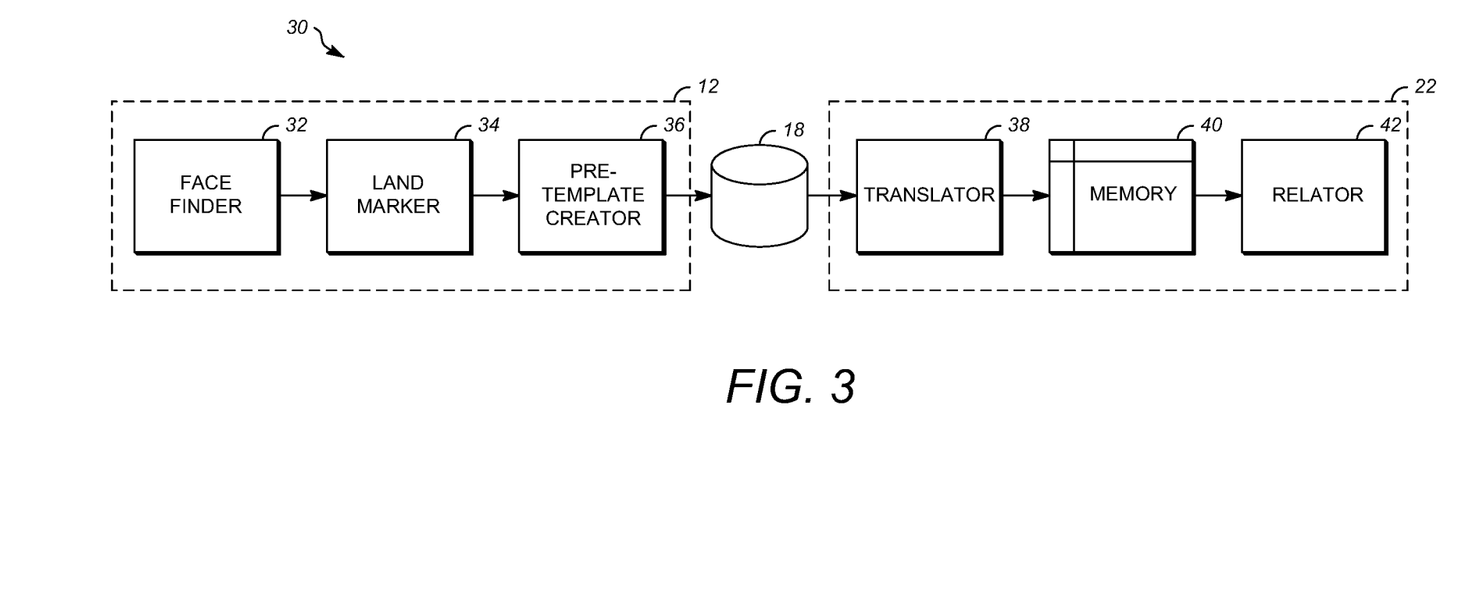
FIG. 3 is a block diagram of a facial recognition system including the pre-template generator of FIG. 1 and the pre-template convertor of FIG. 2.

FIG. 3 illustrates a facial recognition system 30 including the pre-template generator 12, the storage medium 18 the pre-template converter 22. Pre-template generator 12 and pre-template converter 22 may or may not be within the same geographical location. For example, the pre-template generator 12 may be located at location X and the pre-template converter 22 may be located at location Y (different from location X). The pre-templates may be generated at location X and stored on the storage medium 18. Subsequently, the storage medium 18 can be transferred to location Y or accessed by the pre-template converter 22 using another mechanism. For example, the storage medium 18 may not be physically present at location Y and can be accessed using a communication network (e.g. Internet). Alternatively, the storage medium 18 can be transferred to another storage medium (not shown), which can in turn be accessed by the pre-template converter 22. Other techniques of transferring data to and retrieving data from storage medium 18 are possible.

More specifically, the pre-template generator 12 can include a face finder 32, a land marker 34 and a pre-template creator 36. The face finder 32 detects one or more faces in a source image. The source image may be a single image or may be part of an overall video stream. The face finder 32 can implement any current techniques for detecting faces in the source image. The land marker 34 receives data representing the detected face from the face finder 32 and detects facial features such as the eyes, mouth, nose and eyebrows on the detected face. More specifically, the land marker 34 can detect one or more specific positions (i.e. coordinates) of the facial features (e.g. corners of the eyes, corners of the mouth, top and bottom edges of the lips, etc.). Other facial features and positions are also possible.

Once a face and designated facial features on have been detected, this information is transferred to the pre-template creator 36. The pre-template creator 36 creates the pre-template that will be stored in the storage medium 18 and subsequently retrieved by the pre-template converter 22. The face finder 32, the land marker 34 and the pre-template creator 36 will be discussed in more detail below with reference to FIG. 4.

The pre-template converter 22 can include a translator 38, a memory 40 and a relator 42. The translator 38 can convert the pre-template retrieved from the storage medium 18 to a template. Subsequently, the template can be stored in the memory 40. The memory 40 can be the same as memory 26 of FIG. 2 or it can be different. For example, memory 40 can be another RAM device or a cache memory or any other suitable memory device. The memory 40 can store the template which can be used by the relator 42 to identify a face in an input image. The input image, similar to the source image, may be a single image or may be part of an overall video stream. The relator 42 can then use the template to match it with other templates in order to determine, for example, best matches, rankings or clusters to perform facial recognition in current systems.

Figure 4:
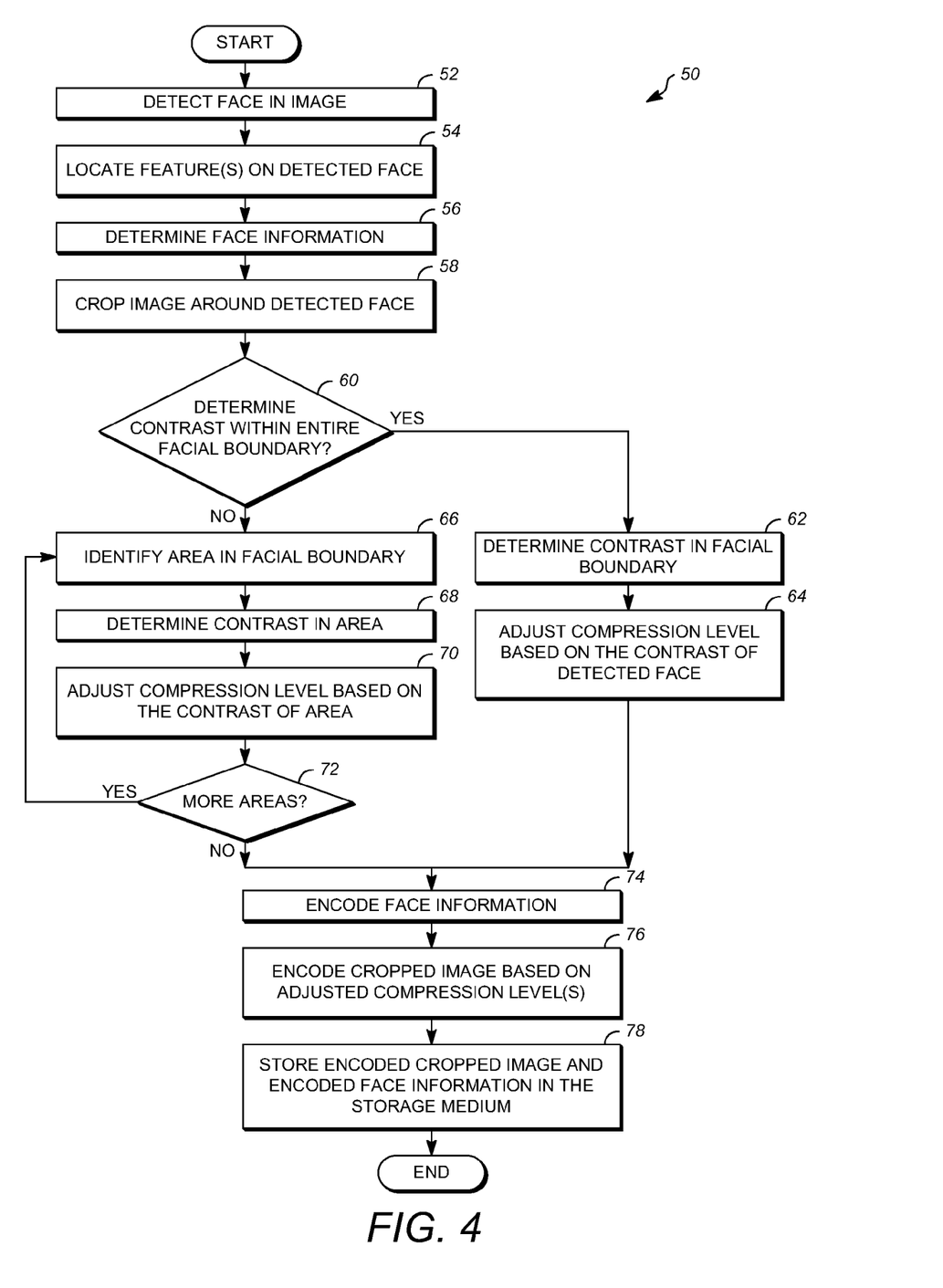
FIG. 4 is a flowchart diagram of an exemplary method of pre-template creator in the pre-template generator of FIG. 1.

FIG. 4 illustrates an exemplary method 50 of pre-template creator in the pre-template generator 12. Beginning at block 52, a face is detected in an image. The processing associated with block 52 can occur in the face finder 32 illustrated in FIG. 3. For ease of the reader's understanding, the embodiments will be described only with reference to detecting a single face in a single image. However, the embodiments can also detect multiple faces in a single image or detect multiple faces in multiple images. More than one image may also be used to detect the face in order to create the pre-template. For example, in some embodiments the pre-template may be created from a combination two or more images.

Once a face has been detected, one or more features can be located on the detected face at block 54. The processing associated with block 54 can occur in the land marker 34. As discussed previously, one or more coordinates of facial features such as the eyes, mouth, nose and eyebrows can be detected. Once the facial features have been detected, face information, such as one or more facial characteristics for the detected face and/or the coordinates of features (determined in block 54), is determined at block 56. Facial characteristics include, but are not limited to, facial boundary, facial size, pose, roll or orientation. Other facial characteristics are possible. Face information can also include other information other than the facial characteristics or the coordinates of the features. For example, in one exemplary implementation, face information can include facial coordinates The processing associated with the remaining blocks (i.e. blocks 58, 60, etc.) can occur in the pre-template creator 36. Once the face information has been determined, the source image containing the detected face is cropped at block 58. The pre-template creator 36 can use the one or more facial characteristics to determine the dimensions in which the face is cropped. For example, if facial boundary is determined as one of the facial characteristics, the cropped image can at least containing all of the pixels included within the facial boundary. In other instances, the cropped image may not contain all of the pixels included within the facial boundary. The facial boundary can be elliptical, square, triangular or any other suitable shape. Other techniques for cropping the source image around the detected face are also available. Optionally, once the source image is cropped, it may be normalized. Normalization may also occur at another point (e.g. before the image is cropped).

Once the image has been cropped, a contrast for the face can be determined. At decision block 60, control determines whether the contrast should be determined within the entire facial boundary. If the contrast should be determined within the entire boundary, control the contrast in the entire facial boundary is determined at block 62. Contrast can be dependent on any factor applied to intensities and can be determined using a variety of techniques, as will be recognized by those skilled in the art. For example, contrast can be determined using the Root mean square (RMS) deviation of pixel intensities. In one implementation, RMS deviation can be determined using the following equation:

$$\gamma = \sqrt{\frac{1}{N} \sum_{pixels} (I_i - \bar{I})^2}\ ;$$

wherein
$I_i$ is the intensity of the $i^{th}$ pixel of the image;
$\bar{I}$ is the average intensity of all pixels in the image; and
N is the number of pixels in the image.
Other techniques for determining contrast are also available. Some of these techniques may take into account color in the cropped image whereas others do not.

Once the contrast has been determined, the compression level can be adjusted based on the contrast of the detected face. Generally, if the detected face, as defined by the facial boundary, has high contrast, the cropped image can be encoded at a higher level of compression. Conversely, if the detected face image has low contrast, the image can be encoded at a lower level of compression. The level of compression can be adjusted using a variety of techniques. For example, coefficients in a quantization matrix in, for example, the JPEG-codec or any other suitable codec, can be adjusted. Generally, a quantization matrix containing larger values can provide coarser quantization (i.e. higher level of compression) and a quantization matrix containing smaller values can provide finer quantization (i.e. lower level of compression). In one example, a quantization matrix Q is adjusted using the following equations:

$$Q_{ij} = \alpha + (i+j)\beta\gamma \text{ when } i, j \ne 0;$$

$$Q_{00} = \alpha + \delta\gamma \text{ when } i, j = 0; \text{ wherein}$$

is a row in the adjusted quantization matrix;
j is a column in the adjusted quantization matrix;
$\gamma$ is a contrast-coefficient, representing the contrast measured on the facial area in the image and which was discussed previously;
$\alpha$ is a constant representing an expected level of white noise in the cropped image;
$\beta$ is a constant providing frequency-dependent quantization; and
$\delta$ is a value for brightness-quantization.

In addition to adjusting the values in the quantization matrix, the pre-adjusted values in the quantization matrix can provide optimal compression for faces. Alternatively, the values in the quantization matrix do not have to be optimized for faces. Alternative adjustments can be to the face-optimized quantization matrix.

The resulting adjusted values in the quantization matrix can be used during encoding. Specifically, face information associated with the cropped image at block 74 and the cropped imaged is encoded at block 76 based on the adjusted compression level (e.g. quantization matrix $Q_{ij}$). The face information can include one or more facial characteristics and/or facial features. The encoded face information can be stored with the encoded cropped image in the storage medium 18.

Other techniques for adjusting the compression level are also available which can be used in lieu of or in addition to adjusting the quantization matrix. For example, in one embodiment, the encoded cropped image can be sub-sampled. More specifically, sub-sampling at a higher rate can provide a higher level of compression and sub-sampling at a lower rate can provide a lower level of compression.

Returning to decision block 60, if the contrast should not be determined within the entire boundary, control moves to block 66 to identify one or more areas in the facial boundary to be adjusted. The areas can be any part in the facial boundary such as the eyes, cheeks, nose, mouth, etc. In this manner, compression can be varied according to the importance of the facial area with respect to face recognition (e.g. lower compression around eyes, higher compression on cheeks. In this example, reference will only be made to two facial areas (eyes and cheeks) to ease the reader's understanding of the embodiments. Once the area has been identified (e.g., eyes), the contrast can be determined in the area at block 68. The compression level can then be adjusted based on the contrast of the specific facial area at block 70. Thus, since in some embodiments, it may be desirable that the eyes have lower compression applied, the values of $\gamma$, $\alpha$, $\beta$ and $\delta$ discussed previously can be modified to provide a desired compression level.

After the compression level has been adjusted for the identified area similar to as described previously with respect to the entire facial boundary, control can determine if there are more areas (e.g., cheeks) at decision block 72. If there are more areas to have the compression level adjusted, control returns to block 66 to perform adjustment. Otherwise, control moves to encode the face information (block 74), encode the cropped image (block 76) and store the same in the storage medium 18 (block 78) as described previously.

Figure 5:
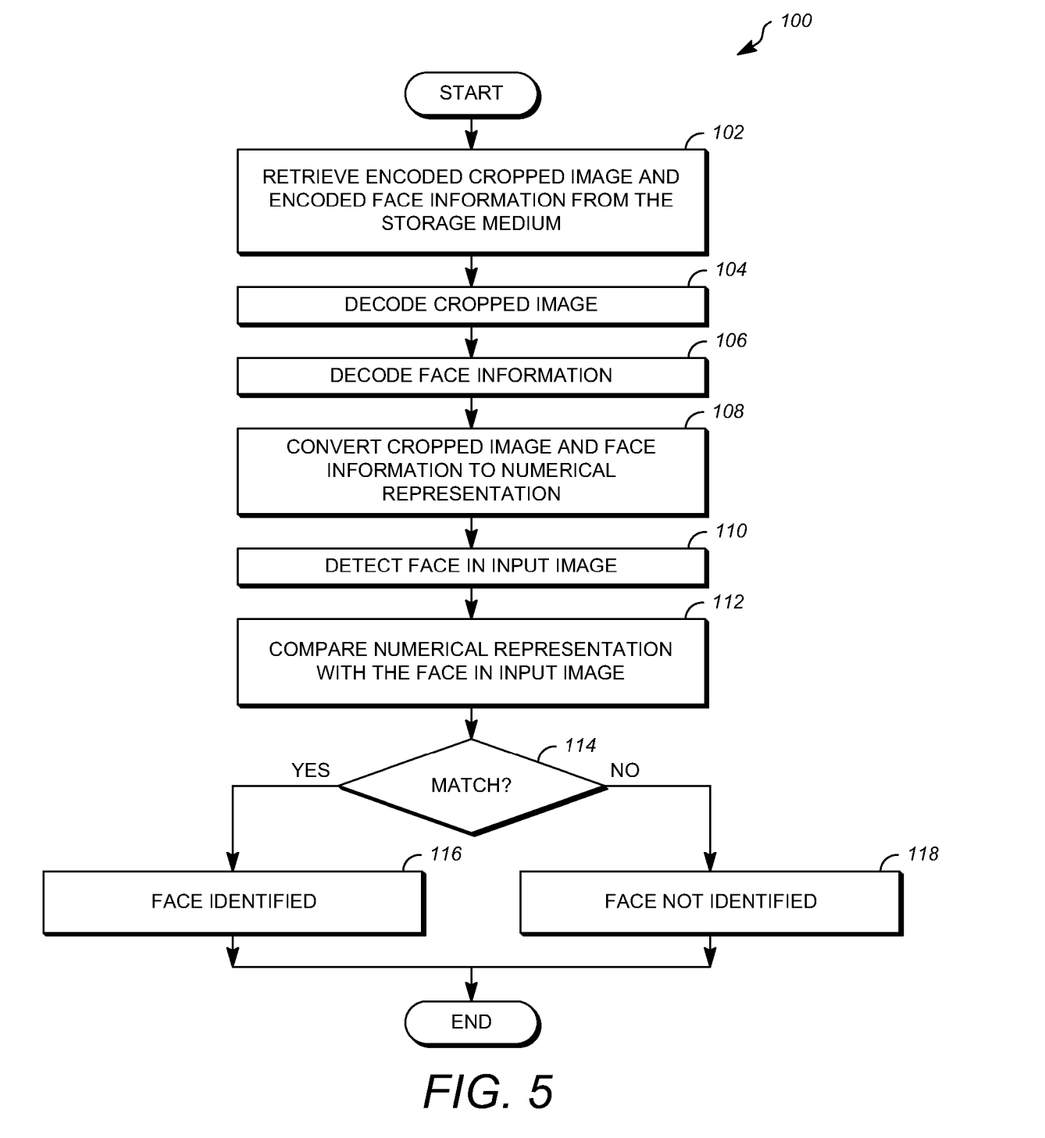
FIG. 5 is a flowchart diagram of an exemplary method of pre-template conversion in the pre-template convertor of FIG. 2.

FIG. 5 illustrates an exemplary method 100 of pre-template conversion in the pre-template convertor of FIG. 2. Beginning at block 102, the encoded cropped image and encoded face information can be retrieved from the storage medium 18. The cropped image is then decoded at block 104 and the face information is then decoded at block 106. The decoded cropped image can then be converted to a numerical representation of the face (i.e. the template) using the face information at block 108, which can be stored in the memory 40. Once the template is created, it can be retrieved from the memory 40 and used in face detection for recognizing/identifying a face in an input image. Accordingly, at block 110 a face is detected in the input image. The numerical representation is compared with the face in the input image at block 112. Control then moves to decision block 114 to determine if there is a match. If there is a match, a face has been identified successfully at block 116. Otherwise, the face has not been identified at block 118. The process then ends. In some embodiments, if a face has not been identified, other templates (which have been converted from pre-templates) can be compared with the face detected in the input image until the face is recognized.

Figure 6:
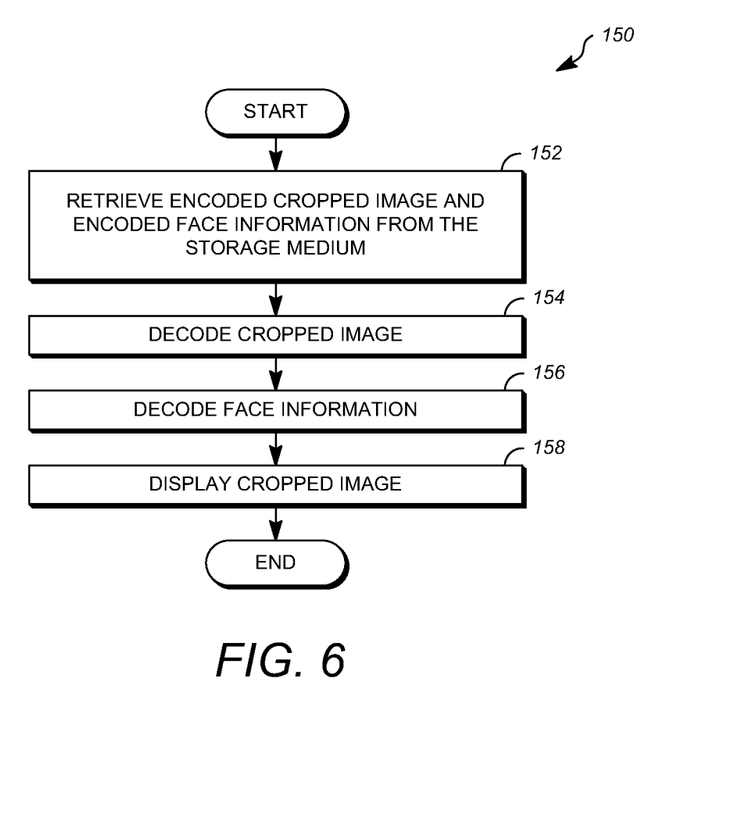
FIG. 6 is a flowchart diagram of another exemplary method of pre-template conversion in the pre-template convertor of FIG. 2.

FIG. 6 illustrates another exemplary method 150 of pre-template conversion in the pre-template convertor 22. Beginning at block 152, the encoded cropped image and encoded face information can be retrieved from the storage medium 18. The cropped image is then decoded at block 154 and the face information is then decoded at block 156. In this instance, rather than convert the decoded cropped image and face information to the numerical representation (i.e. the template), the cropped image can be displayed on a display. The cropped image can be, for example, a thumbnail picture of the face associated with the pre-template. In this embodiment, since there may be no face recognition, the relator 42 in the pre-template converter 22 may be eliminated.

Unlike current systems that only use the numerical representation or template, systems that use pre-templates permit face recognition to be performed without storing the templates on the storage medium 18. In some instances, for example, it may not be permissible to store the template on the storage medium 18. The embodiments described herein permit the pre-templates rather than the template to be stored on the storage medium 18.

Further since templates are created from the pre-templates, changes to the face recognition application (i.e. the relator 42) can occur without rendering the templates obsolete because the templates are created using the pre-templates during the conversion process. In this manner, rather than having a template format that may be highly specific to the relator 42, changes to the relator 42 will not render the templates unusable.

The embodiments described herein can also be used in recognition systems that can recognize anatomical features other than or in addition to the face such as a fingerprint, palm or iris. Other anatomical features are also possible. Similar techniques discussed previously to create the pre-template and subsequently convert the pre-template to a template are also applicable to these other anatomical features.

The embodiments described herein can be used in a variety of face recognition applications including authentication and/or identification. For example, a user can utilize the embodiments to tag family and friends in photos and videos. In this instance, pre-templates can be created from selected source images provided by the user. Once created, the pre-templates can be stored onto the storage medium 18 (e.g. flash drive). Subsequently, the user can load the flash drive onto their computer and use an application to tag input images using the pre-templates. Of course, this is only one example and the embodiments may be used in a variety of applications.

To the extent that the pre-template contains personal identifiable information, it can be the subject of appropriate security and privacy safeguards. In some embodiments, pre-templates are only performed for people who have signed up ("opted-in") for pre-template generation. In other embodiments, however, the pre-template generation is performed for anyone regardless of whether they have opted in to the having a pre-template created. In other embodiments, pre-templates may not be created for a selected group of people regardless if they have opted in. For example, pre-templates may not be created for those who fall under a certain age.

The embodiments of the pre-template generator 12 and/or the pre-template converter 22 (and the algorithms, methods, instructions, etc. stored thereon and/or executed thereby) can be realized in hardware including, for example, intellectual property (IP) cores, application-specific integrated circuits (ASICs), programmable logic arrays, optical processors, programmable logic controllers, microcode, microcontrollers, servers, microprocessors, digital signal processors or any other suitable circuit. In the claims, the term "processor" should be understood as encompassing any of the foregoing, either singly or in combination. The terms "signal" and "data" are used interchangeably. Further, portions of the pre-template generator 12 and the pre-template converter 22 do not necessarily have to be implemented in the same manner.

Further, in one embodiment, for example, the pre-template generator 12 or the pre-template converter 22 can be implemented using a general purpose computer/processor with a computer program that, when executed, carries out any of the respective methods, algorithms and/or instructions described herein. In addition or alternatively, for example, a special purpose computer/processor can be utilized which can contain specialized hardware for carrying out any of the methods, algorithms, or instructions described herein.

Further, all or a portion of embodiments of the present invention can take the form of a computer program product accessible from, for example, a computer-usable or computer-readable medium. A computer-usable or computer-readable medium can be any device that can, for example, tangibly contain, store, communicate, or transport the program for use by or in connection with any processor. The medium can be, for example, an electronic, magnetic, optical, electromagnetic, or a semiconductor device. Other suitable mediums are also available.

The above-described embodiments have been described in order to allow easy understanding of the present invention and do not limit the present invention. On the contrary, the invention is intended to cover various modifications and equivalent arrangements included within the scope of the appended claims, which scope is to be accorded the broadest interpretation so as to encompass all such modifications and equivalent structure as is permitted under the law.

What is claimed is:

1. A method for facial recognition using a pre-template, comprising:
   detecting a face in a source image;
   determining face information for the detected face;
   cropping the source image around the detected face;
   adjusting a compression level based on a contrast of at least a portion of the detected face using a processor;
   encoding the cropped image based on the adjusted compression level;
   storing the encoded cropped image and the face information in a storage medium;
   obtaining an input image; and in response to obtaining the input image:
obtaining the encoded cropped image from the storage medium,
converting the encoded cropped image to a numerical representation of the detected face, and
comparing the numerical representation of the detected face with the input image.

2. The method of claim 1, further comprising:
locating at least one feature on the detected face to determine one or more facial characteristics, wherein the face information is indicative of the at least one feature or the one or more facial characteristics.

3. The method of claim 2, further comprising:
encoding the face information; and
storing the encoded face information with the encoded cropped image in the storage medium.

4. The method of claim 2, wherein cropping the source image comprises:
cropping the source image around the detected face based on the one or more facial characteristics.

5. The method of claim 2, wherein the at least one feature is a position on an eye, a position on a mouth, a position on an eyebrow or a position on a nose.

6. The method of claim 2, wherein the one or more facial characteristics further include at least one of facial boundary, facial size, pose, roll or orientation.

7. The method of claim 6, further comprising:
defining the facial boundary of the detected face in the cropped image.

8. The method of claim 7, wherein the contrast is determined on an area at least partially within the facial boundary and wherein adjusting the compression level comprises:
adjusting a quantization matrix based on the contrast.

9. A method for creating a pre-template for use in facial recognition, comprising:
detecting a face in a source image;
determining face information for the detected face;
cropping the source image around the detected face;
defining a facial boundary of the detected face in the cropped image;
adjusting a compression level based on a contrast of at least a portion of the detected face using a processor, wherein the contrast is determined based on an area at least partially within the facial boundary, and adjusting the compression level includes adjusting a quantization matrix based on the contrast using at least one of the following equations:

$$Q_{ij} = \alpha + (i+j)\beta\gamma \text{ when } i, j \neq 0, \text{ or}$$

$$Q_{00} = \alpha + \delta\gamma \text{ when } i, j = 0,$$

wherein Q is the adjusted quantization matrix, i is a row in the adjusted quantization matrix, j is a column in the adjusted quantization matrix, γ is a contrast-coefficient, representing the contrast measured within the facial boundary in the image, α is a constant representing an expected level of white noise in the cropped image, β is a constant providing frequency-dependent quantization, and δ is a value for brightness-quantization;
encoding the cropped image based on the adjusted compression level; and
storing the encoded cropped image and the face information in a storage medium, wherein the encoded cropped image is subsequently retrieved from the storage medium, decoded and converted to a numerical representation of the detected face to compare the numerical representation with a face in an input image.

10. A method for creating a pre-template for use in facial recognition, comprising:
detecting a face in a source image;
determining face information for the detected face;
cropping the source image around the detected face;
adjusting a compression level based on a contrast of at least a portion of the detected face using a processor by identifying a first area and at least a second area on the detected face, determining a contrast of the first area and a contrast of the second area, selecting a first quantization matrix to encode the first area of the detected face and a second quantization matrix to encode the second area of the detected face, the first quantization matrix having more quantization levels than the second quantization matrix, adjusting the first quantization matrix based on the contrast of the first area, and adjusting the second quantization matrix based on the contrast of the second area;
encoding the cropped image based on the adjusted compression level; and
storing the encoded cropped image and the face information in a storage medium, wherein the encoded cropped image is subsequently retrieved from the storage medium, decoded and converted to a numerical representation of the detected face to compare the numerical representation with a face in an input image.

11. An apparatus for creating a pre-template for use in facial recognition, comprising:
a memory;
at least one processor configured to execute instructions stored in the memory to:
detect a face in a source image;
determine face information for the detected face;
crop the source image around the detected face;
identify a first area and at least a second area on the detected face;
determine a contrast of the first area and a contrast of the second area;
select a first quantization matrix to encode the first area of the detected face and a second quantization matrix to encode the second area of the detected face, the first quantization matrix having more quantization levels than the second quantization matrix
adjust the first quantization matrix based on the contrast of the first area;
adjust the second quantization matrix based on the contrast of the second area;
encode the cropped image using the first quantization matrix and the second quantization matrix; and
store the encoded cropped image and the face information in a storage medium, wherein the encoded cropped image is subsequently retrieved from the storage medium, decoded and converted to a numerical representation of the detected face to compare the numerical representation with a face in an input image.

12. The apparatus of claim 11, wherein the processor is further configured to execute instructions stored in the memory to:
locate at least one feature on the detected face to determine one or more facial characteristics, wherein the face information is indicative of the at least one feature or the one or more facial characteristics.

13. The apparatus of claim 12, wherein the processor is further configured to execute instructions stored in the memory to:

encode the face information; and store the encoded face information with the encoded cropped image in the storage medium.

14. The apparatus of claim 12, wherein the processor is further configured to execute instructions stored in the memory to:

crop the source image around the detected face based on the one or more facial characteristics.

15. A facial recognition system, comprising:

a storage medium;

a first server configured to:

detect a face in a source image;

determine face information for the detected face;

crop the source image around the detected face;

identify a first area and at least a second area on the detected face;

determine a contrast of the first area and a contrast of the second area;

select a first quantization matrix to encode the first area of the detected face and a second quantization matrix to encode the second area of the detected face, the first quantization matrix having more quantization levels than the second quantization matrix adjust the first quantization matrix based on the contrast of the first area;

adjust the second quantization matrix based on the contrast of the second area;

encode the cropped image using the first quantization matrix and the second quantization matrix;

store the encoded cropped image and the face information in the storage medium; and a second server configured to:

retrieve the encoded cropped image from the storage medium;

decode the encoded cropped image;

convert the decoded cropped image to a numerical representation of the detected face using the face information;

detect a face in an input image; and compare the numerical representation with the face in the input image.

16. A system, comprising:

one or more processors; and one or more memory devices for storing program instructions used by the one or more processors, wherein the program instructions, when executed by the one or more processors, cause the one or more processors to:

detect a face in a source image;

determine face information for the detected face;

crop the source image around the detected face;

adjust a compression level based on a contrast of at least a portion of the detected face using a processor;

encode the cropped image based on the adjusted compression level;

store the encoded cropped image and the face information in a storage medium;

receive an input image; and in response to receiving the input image:

retrieve the encoded cropped image from the storage medium, convert the encoded cropped image to a numerical representation of the detected face, and compare the numerical representation of the detected face with the input image.

17. The system of claim 16, wherein the program instructions, when executed by the one or more processors, further cause the one or more processors to:

locate at least one feature on the detected face to determine one or more facial characteristics, wherein the face information is indicative of the at least one feature or the one or more facial characteristics.

18. The system of claim 17, wherein the program instructions, when executed by the one or more processors, further cause the one or more processors to:

encode the face information; and store the encoded face information with the encoded cropped image in the storage medium.

19. The system of claim 17, wherein the program instructions to crop the source image around the detected face, when executed by the one or more processors, further cause the one or more processors to:

crop the source image around the detected face based on the one or more facial characteristics.

20. The system of claim 16, wherein the program instructions, when executed by the one or more processors, further cause the one or more processors to:

define a facial boundary of the detected face in the cropped image.

21. The system of claim 20, wherein the contrast is determined on an area at least partially within the facial boundary and wherein the program instructions to adjust the compression level, when executed by the one or more processors, further cause the one or more processors to:

adjust a quantization matrix based on the contrast.

22. A non-transitory computer-readable storage device including program instructions executable by one or more processors that, when executed, cause the one or more processors to perform operations, the operations comprising:

detecting a face in a source image;

determining face information for the detected face;

cropping the source image around the detected face;

adjusting a compression level based on a contrast of at least a portion of the detected face using a processor;

encoding the cropped image based on the adjusted compression level;

storing the encoded cropped image and the face information in a storage medium;

receiving an input image; and in response to receiving the input image:

retrieving the encoded cropped image from the storage medium, converting the encoded cropped image to a numerical representation of the detected face, and comparing the numerical representation of the detected face with the input image.

23. The non-transitory computer-readable storage device of claim 22, further comprising:

locating at least one feature on the detected face to determine one or more facial characteristics, wherein the face information is indicative of the at least one feature or the one or more facial characteristics.

24. The non-transitory computer-readable storage device of claim 23, further comprising:

encoding the face information; and storing the encoded face information with the encoded cropped image in the storage medium.

25. The non-transitory computer-readable storage device of claim 23, wherein cropping the source image comprises:

cropping the source image around the detected face based on the one or more facial characteristics.

26. The non-transitory computer-readable storage device of claim 22, further comprising:

defining a facial boundary of the detected face in the cropped image.

27. The non-transitory computer-readable storage device of claim 26, wherein the contrast is determined on an area at least partially within the facial boundary and wherein adjusting the compression level comprises:
adjusting a quantization matrix based on the contrast.

28. A method for facial recognition using a pre-template, comprising:
selecting, by a processor, a compression level for an image based on a contrast of at least a portion of a detected face in the image;
encoding the image based on the selected compression level;
storing the encoded image in a storage medium;
receiving an input image; and
in response to receiving the input image:
retrieving the encoded image from the storage medium;
converting the encoded image to a numerical representation of the detected face, and
comparing the numerical representation of the detected face with the input image.

29. The method of claim 28, further comprising:
locating at least one feature on the detected face to determine one or more facial characteristics.

30. The method of claim 29, wherein the image is a cropped source image that has been cropped around the detected face based on the one or more facial characteristics.

31. The method of claim 29, wherein the at least one feature is a position on an eye, a position on a mouth, a position on an eyebrow or a position on a nose.

32. The method of claim 29, wherein the one or more facial characteristics further include at least one of facial boundary, facial size, pose, roll or orientation.

33. The method of claim 28, wherein the contrast is determined on an area at least partially within a facial boundary of the detected face and wherein selecting the compression level selecting a quantization matrix based on the contrast.

34. A non-transitory computer-readable storage device including program instructions executable by one or more processors that, when executed, cause the one or more processors to perform operations, the operations comprising:
selecting a compression level for an image based on a contrast of at least a portion of a detected face in the image;
encoding the image based on the selected compression level;
storing the encoded image in a storage medium;
receiving an input image; and
in response to receiving the input image:
retrieving the encoded image from the storage medium;
converting the encoded image to a numerical representation of the detected face, and
comparing the numerical representation of the detected face with the input image.

35. The non-transitory computer-readable storage device of claim 34, the operations further comprising:
locating at least one feature on the detected face to determine one or more facial characteristics.

36. The non-transitory computer-readable storage device of claim 35, wherein the image is a cropped source image that has been cropped around the detected face based on the one or more facial characteristics.

37. The non-transitory computer-readable storage device of claim 35, wherein the at least one feature is a position on an eye, a position on a mouth, a position on an eyebrow or a position on a nose.

38. The non-transitory computer-readable storage device of claim 35, wherein the one or more facial characteristics further include at least one of facial boundary, facial size, pose, roll or orientation.

39. The non-transitory computer-readable storage device of claim 34, wherein the contrast is determined on an area at least partially within a facial boundary of the detected face and wherein selecting the compression level selecting a quantization matrix based on the contrast.

40. A system, comprising:
one or more processors; and
one or more memory devices for storing program instructions used by the one or more processors, wherein the program instructions, when executed by the one or more processors, cause the one or more processors to:
selecting a compression level for an image based on a contrast of at least a portion of a detected face in the image;
encoding the image based on the selected compression level;
storing the encoded image in a storage medium;
receiving an input image; and
in response to receiving the input image:
retrieving the encoded image from the storage medium;
converting the encoded image to a numerical representation of the detected face, and
comparing the numerical representation of the detected face with the input image.

* * * * *